3,580,871
PROCESS FOR THE MANUFACTURE OF POLYMER DISPERSIONS WITH POSITIVE ZETA POTENTIAL
Karl Josef Rauterkus, Kelkheim, Taunus, and Hansjorg Vollmann, Frankfurt am Main, Germany, assignors to Farbwerke Hoechst Aktiengesellschaft vormals Meister Lucius & Bruning, Frankfurt am Main, Germany
No Drawing. Continuation-in-part of application Ser. No. 640,490, May 23, 1967. This application July 15, 1969, Ser. No. 842,005
Claims priority, application Germany, June 1, 1966, F 49,358
Int. Cl. C08f 1/13
U.S. Cl. 260—17                                      5 Claims

ABSTRACT OF THE DISCLOSURE

Polymer dispersions with positive zeta potential produced by emulsion polymerization of at least one vinyl, vinylidene, acryl or methacryl compound in the presence of a free radical polymerization catalyst and in the presence of at least one basically substituted N-vinyl amide.

---

The present application is a continuation-in-part application of application Ser. No. 640,490 filed May 23, 1967, now abandoned.

The present invention relates to a process for the manufacture of plastics dispersions with positive zeta potential.

It is known to add in the manufacture of plastics dispersions by emulsion polymerization cationic emulsifiers which confer upon the latex particles a positive charge. Owing to the ready mobility of the emulsifiers on the surface of the latex particles and their capacity to migrate into the aqueous phase as well as into the latex particles depending on the solubility, the dispersions are in most cases insufficiently stable. When they are diluted with water they readily coagulate and form aggregates and, therefore, they often do not have the desired utilitarian properties, above all a good affinity for negatively charged substrata, as the polymer contained in the latex particles is neutral. In the field of paints plastics dispersions with positively charged latex particles are unsuitable for many purposes because they are compatible neither with a pigment paste, nor with an aqueous suspension of the pigment and much less still with dry pigments.

The present invention provides a process for the manufacture of polymer dispersion with positive zeta potential by emulsion polymerization of a vinyl ester of an organic acid, an ester of an unsaturated carboxylic acid and a monohydric saturated alcohol having 1 to 18 carbon atoms, a monoester of an unsaturated carboxylic acid and a dihydric or trihydric saturated aliphatic alcohol having up to 5 carbon atoms, vinyl chloride, vinylidene chloride, styrene, acrylonitrile, ethylene, an α-olefin with up to 18 carbon atoms or mixtures of the aforesaid monomers together with 0.1 to 40%, calculated on the total weight of the monomers, of at least one basically substituted N-vinyl amide of the general formula

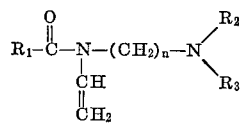

or

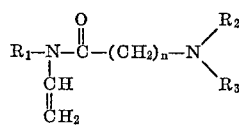

in which $R_1$ stands for an alkyl radical, preferably having 1 to 4 carbon atoms, $R_2$ and $R_3$ represent alkyl radicals preferably having 1 to 4 carbon atoms, which may be linked with one another with formation of a five to six-membered ring, possibly with inclusion of a heteroatom which may be oxygen, sulfur or nitrogen and $n$ is 1, 2, or 3, in the presence of a free radical polymerization catalyst at a pH in the range of from 3 to 9, at a temperature of from 20 to 90° C., wherein there is used an emulsifier combination consisting of (a) 0.5 to 3% by weight of a cationic emulsifier,
(b) 1 to 5% by weight of a hydroxyethylated alkylphenol having 9 to 12 carbon atoms in the alkyl chain or a hydroxyethylated saturated monovalent aliphatic alcohol having 12 to 18 carbon atoms or a hydroxyethylated aliphatic carboxylic acid having 12 to 18 carbon atoms, the said compounds containing 10 to 50 moles of ethylene oxide per mole of phenol, alcohol or carboxylic acid, respectively, and
(c) Optionally 1 to 10% by weight of a protective colloid selected from the group consisting of polyvinyl alcohol, polyvinyl pyrrolidone, poly-N-vinylalkyl-carboxylic acid amide, the alkyl-group of which contains preferably 1 to 6 carbon atoms, hydroxyethyl cellulose, the percentages being calculated on the total amount of monomers.

The process of the invention permits the manufacture of polymer dispersions with positive zeta potential that are stable in storage, stable towards pigments and capable of being diluted with water.

The zeta potential of the dispersions can be regulated under otherwise identical conditions by varying the amount of incorporated basic N-vinyl amide.

The dispersions are produced by polymerizing at least one vinyl, vinylidene, acrylic or methacrylic compound by a known process of the emulsion polymerization as described, for example in the book "Emulsion Polymerization" by F. A. Bovey, I. M. Kolthoff, A. I. Medalia, E. J. Meehan, Interscience Publishers, Inc. New York, 1955. Polymers of one or a plurality of the following monomers can be produced:

Vinyl esters of linear and branched aliphatic, cycloaliphatic, and aromatic carboxylic acids, for example vinyl acetate, vinyl propionate, vinyl butyrate, vinyl laurate, vinyl stearate, vinyl isobutyrate, vinyl esters of cyclohexane carboxylic acid and p-toluic acid; furthermore esters of unsaturated carboxylic acids and saturated monohydric aliphatic alcohols having 1 to 18 carbon atoms, or monoesters of unsaturated carboxylic acids and polyhydric, preferably dihydric or trihydric saturated aliphatic alcohols with up to 5 carbon atoms, for example esters of acrylic acid, methacrylic acid, maleic acid, fumaric acid, as well as vinyl chloride, vinylidene chloride, styrene, acrylonitrile, ethylene, α-olefins with up to 18 carbon atoms, or mixtures of the aforesaid monomers.

Cationic emulsifiers to be used in the process of the invention are trimethyl soy bean oil ammonium chloride, salts of paraffin monoamines preferably salts of monoamines of paraffins with preferably 8 to 18 carbon atoms, preferably the acetates or hydrochlorides, for example the hydrochloride of dodecyl amine, condensation products of oleic acid and N,N-dialkylene diamine, the alkylene group of which contains preferably 2 to 6 carbon atoms, for example diethyl-aminoethyl-oleic acid amide, pyridinium salts such as cetyl-pyridinium chloride or lauryl-pyridinium sulfate, as well as the salts of hydrogenated or dehydrogenated abiethyl amines. The cationic emulsifiers are used in an amount of from 0.5 to 3% by weight, preferably 1 to 2% by weight, calculated on the monomer mixture. The specified non ionic hydroxyethylated emulsifiers, of which hydroxyethylated nonylphenol is preferred, are used in an amount of from 1 to 5, preferably 2 to 4% by weight.

The dispersions are produced by known methods. The monomer or monomer mixture is dropped into the mixture of the other reactants or a monomer emulsion is prepared first, which is introduced into the reaction vessel either all at once or successively, depending on the polymerization rate or the reaction heat set free.

The dispersions produced by the process according to the invention are suitable as binders for pigments, pressure sensitive adhesives, paper glue, sizing agents, for coating sheets and paper and for the manufacture of bright drying emulsions.

The following examples serve to illustrate the invention but they are not intended to limit it thereto, the percentages being by weight.

EXAMPLE 1

12 grams of trimethyl-soybean oil ammonium chloride (50% solution)

6 grams of a reaction product of 1 mole of nonyl phenol with 30 moles of ethylene oxide 86 grams of polyvinyl alcohol having a residual acetyl content of 10.5%, prepared by alkaline saponification of a polyvinyl acetate having a K value of 30 were dissolved in 310 grams of desalted water. 45 grams of N - vinyl - N - (3' - dimethylaminopropyl)-acetamide were added to the solution and the pH was adjusted to a value of 7.5 with glacial acetic acid. The mixture was heated at 80° C. and 4 millimeters of 30% $H_2O_2$ were added. Over a period of 3 to 4 hours 300 grams of a monomer mixture as defined in Table 1 were added. When the addition was terminated 8 milliliters of 30% $H_2O_2$ were added and the whole was heated for 2 hours at 80–85° C. To remove small amounts of unreacted monomers, if any, nitrogen or steam was passed through the reaction mixture, if necessary under reduced pressure. After cooling polymer dispersions were obtained having a solids content of about 50% and a positive zeta potential.

In Table 1 are listed the monomer or monomer mixture and the zeta potential of the respective dispersion.

TABLE 1

| Monomers: | Zeta potential/mv. |
|---|---|
| 100% methyl acrylate | +64.0 |
| 50% methyl acrylate/50% vinylisobutyrate | +62.4 |
| 75% methyl acrylate/25% vinylisobutyrate | +60.4 |
| 80% methyl acrylate/20% vinyl acetate | +65.8 |
| 70% methyl acrylate/30% vinyl ester of a mixture of monobasic branched aliphatic saturated carboxylic acids with 9–11 carbon atoms | +68.0 |
| 80% methyl acrylate/20% cyclohexane carboxylic acid vinyl ester | +63.2 |
| 70% methyl acrylate/30% p-toluic acid vinyl ester | +65.2 |

All dispersions were compatible with a dry pigment mixture consisting of 40 parts by weight of titanium dioxide, 52 parts by weight of barium sulfate, 5 parts by weight of talcum and 3 parts by weight of chalk. The compatibility was tested as follows: 1 part of the respective dispersion and 1 part of the pigment mixture were mixed and stirred, if necessary with the addition of a small amount of water, until the pigment was homogeneously dispersed. The dispersions did not coagulate and when they were spread with a glass rod on a glass plate, smooth, homogenous films without knots were formed.

When the same dispersions were prepared in the absence of N-vinyl-N-(3'-dimethylaminopropyl)-acetamide they coagulated when the dry pigment mixture was added and the films on the glass plate were inhomogeneous.

EXAMPLE 2

A dispersion was prepared under the conditions specified in Example 1 with the exception that only 3 grams of trimethyl soybean oil ammonium chloride (50% solution) were used. The monomer mixture consisted of 80% of ethyl acrylate and 20% of methyl-methacrylate.

A finely dispersed dispersion was obtained having a solids content of about 50% and a zeta potential of +70.6 mv.

EXAMPLE 3

A dispersion was prepared under the conditions specified in Example 1. The monomer mixture consisted of 75% of methyl acrylate and 25% of vinyl isobutyrate.

The amount of N-vinyl-N-(3'-dimethylaminopropyl) acetamide used varied from 0 to 20%, calculated on the monomer mixture. The test results summarized in Table 2 indicate that the zeta potential of the dispersion can be regulated by the amount of basic monomer to be incorporated by polymerization, whereby the number of knots is reduced.

TABLE 2

| Amount of N-vinyl-N-(3'-dimethyl-amino-propyl)-acetamide | | Zeta potential | Dispersion film on glass plate |
|---|---|---|---|
| Percent | Grams | [mv.] | |
| 0 | 0 | +24.5 | A great number of knots finely gritty. |
| 5 | 15 | +33.6 | Homogeneous, good. |
| 10 | 30 | +54.0 | Do. |
| 15 | 45 | +60.4 | Do. |
| 20 | 60 | +65.5 | Do. |

EXAMPLE 4

12 grams of a reaction product of 1 mole of nonyl phenol with 30 moles of ethylene oxide and 45 grams of N-vinyl-N-(3'-dimethyl-aminopropyl)-acetamide were dissolved in 220 grams of desalted water, the pH was adjusted at a value of 7.5 with glacial acetic acid and, while thoroughly stirring, a mixture of 210 grams of butyl acrylate and 90 grams of acrylonitrile was added to the solution. A stable emulsion was obtained. The emulsion was dropped over a period of 3–4 hours at a temperature of 80° C., into a solution of 3 grams of trimethyl-soybean oil ammonium chloride (50% solution) and 4 milliliters of 30% $H_2O_2$ in 100 grams of desalted water. When the addition was terminated 8 milliliters of $H_2O_2$ were added and the mixture was heated for 2 hours at 80–85° C. The reaction mixture was further treated as described in Example 1.

A dispersion was obtained having a solids content of about 50% and a zeta potential of +58.6 mv.

When in this example 12 grams of trimethyl-soybean oil ammonium chloride were used, the dispersion obtained had a zeta potential of +55.7 mv. and without the addition of trimethyl-soybean oil ammonium chloride the zeta potential of the dispersion was at +55.1 mv.

This example clearly shows that the height of the zeta potential depends in the first place on the use of N-vinyl-N-(3'-dimethylaminopropyl)-acetamide.

EXAMPLE 5

3 grams of trimethyl-soybean oil ammonium chloride, 6 grams of a reaction product of 1 mole of nonyl phenol with 30 moles of ethylene oxide, 4.5 grams of the polyvinyl alcohol used in Example 1 and 45 grams of N-vinyl - N - (3'-dimethylaminopropyl)-acetamide were dissolved in 310 grams of desalted water. The pH value was adjusted to 7.5 with the acids indicated in Table 3. The mixture was heated at 80° C., 4 milliliters of 30% $H_2O_2$ were added and a mixture of 210 grams of butyl acrylate and 90 grams of acrylonitrile were dropped in over a period of 3–4 hours. When the addition was terminated 8 milliliters of $H_2O_2$ were added and the mixture was heated for 2 hours at 80–85° C. The reaction mixture was further treated as described in Example 1. Dispersions of about 50% strength were obtained the zeta potential of which only depended on the type of the ion of opposite charge used under otherwise identical conditions.

TABLE 3

| Acid used to adjust a pH of 7.5: | Zeta potential [mv.] |
|---|---|
| Hydrochloric acid | +76.7 |
| Acetic acid | +60.6 |
| Phosphoric acid | +40.7 |
| Sulfuric acid | +27.2 |

EXAMPLE 6

Dispersions were prepared under the conditions set forth in Example 1. To adjust the pH, different inorganic and organic acids were used. The monomer mixture consisted of 75° of methyl acrylate and 25% of vinyl isobutyrate.

The dependence of the zeta potential on the type of the ion of opposite charge can be seen in Table 4.

TABLE 4

| Acid used to adjust a pH of 7.5: | Zeta potential [mv.] |
|---|---|
| Hydrochloric acid | +70.6 |
| Acetic acid | +60.4 |
| Phosphoric acid | +62.6 |
| Adipic acid | +44.7 |
| Sulfuric acid | +34.8 |

What is claimed is:

1. In a process for the manufacture of plastics dispersions of the type which comprises polymerizing by emulsion polymerization a vinyl ester of an organic acid, an ester of an unsaturated carboxylic acid and a saturated monohydric alcohol having 1 to 18 carbon atoms, a monoester of an unsaturated carboxylic acid and a dihydric or trihydric saturated aliphatic alcohol with up to 5 carbon atoms, vinyl chloride, vinylidene chloride, styrene, acrylonitrile, an alpha-olefin with up to 18 carbon atoms, or mixtures of the aforesaid monomers, in the presence of a free radical polymerization catalyst at a pH value within the range 3 to 9 at a temperature of 20° to 90° C., the improvement which comprises carrying out the polymerization in the presence of 0.1 to 40%, based on the total weight of the monomers used, of at least one basically substituted N-vinyl amide of the general formula

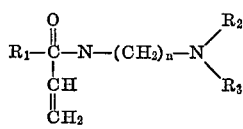

or

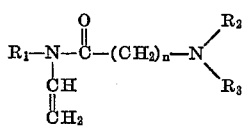

wherein $R_1$ stands for an alkyl radical having 1 to 4 carbon atoms and wherein $R_2$ and $R_3$ represent alkyl radicals having 1 to 4 carbon atoms or a radical wherein said alkyl radicals are linked with one another with formation of a five- to six-membered ring or a radical wherein said alkyl radicals are linked with one another with formation of a five- to six-membered ring with inclusion of oxygen, sulfur or of nitrogen as a hetero-atom, and wherein $n$ is 1 to 3, and in the presence of a combination emulsifier consisting of (a) 1 to 5% by weight of a hydroxyethylated alkylphenol having 12 to 18 carbon atoms in the alkyl chain or a hydroxyethylated aliphatic alcohol having 12 to 18 carbon atoms, or a hydroxyethylated aliphatic carboxylic acid with 12 to 18 carbon atoms, the hydroxyethylated compounds containing 10 to 50 moles of ethylene oxide per mole of phenol, alcohol or carboxylic acid, (b) 0.5 to 3% by weight of a cationic emulsifier selected from the group consisting of trimethyl soy bean oil ammonium chloride, the acetates or hydrochlorides of paraffin monoamines, the condensation products of oleic acid and N,N-dialkylene diamine, pyridinium salts and the salts of hydrogenated or dehydrogenated abiethyl amines and (c) 0 to 10% by weight of a protective colloid selected from the group consisting of polyvinyl alcohol, polyvinyl pyrolidone, poly-N-vinylalkyl carboxylic acid amides and hydroxyethyl cellulose, all percentages being calculated on the total amount of monomers.

2. The process of claim 1 wherein 0.1 to 25% of basically substituted N-vinyl amide are used.

3. The process of claim 1 wherein the polymerization temperature is in the range of from 65 to 80° C.

4. The process of claim 1 wherein the pH value is in the range of from 6 to 8.

5. A plastic dispersion having a positive zeta potential made by the process of claim 1.

References Cited

UNITED STATES PATENTS

| 2,628,224 | 2/1953 | Cairns et al. | 260—89.7 |
| 3,244,658 | 4/1966 | Grosser et al. | 260—29.6HN |
| 3,399,159 | 8/1968 | Samour | 260—29.6HN |

WILLIAM SHORT, Primary Examiner

L. M. PHYNES, Assistant Examiner

U.S. Cl. X.R.

260—29.6, 80.3, 86.1, 89.1, 89.3, 89.5, 89.7